UNITED STATES PATENT OFFICE.

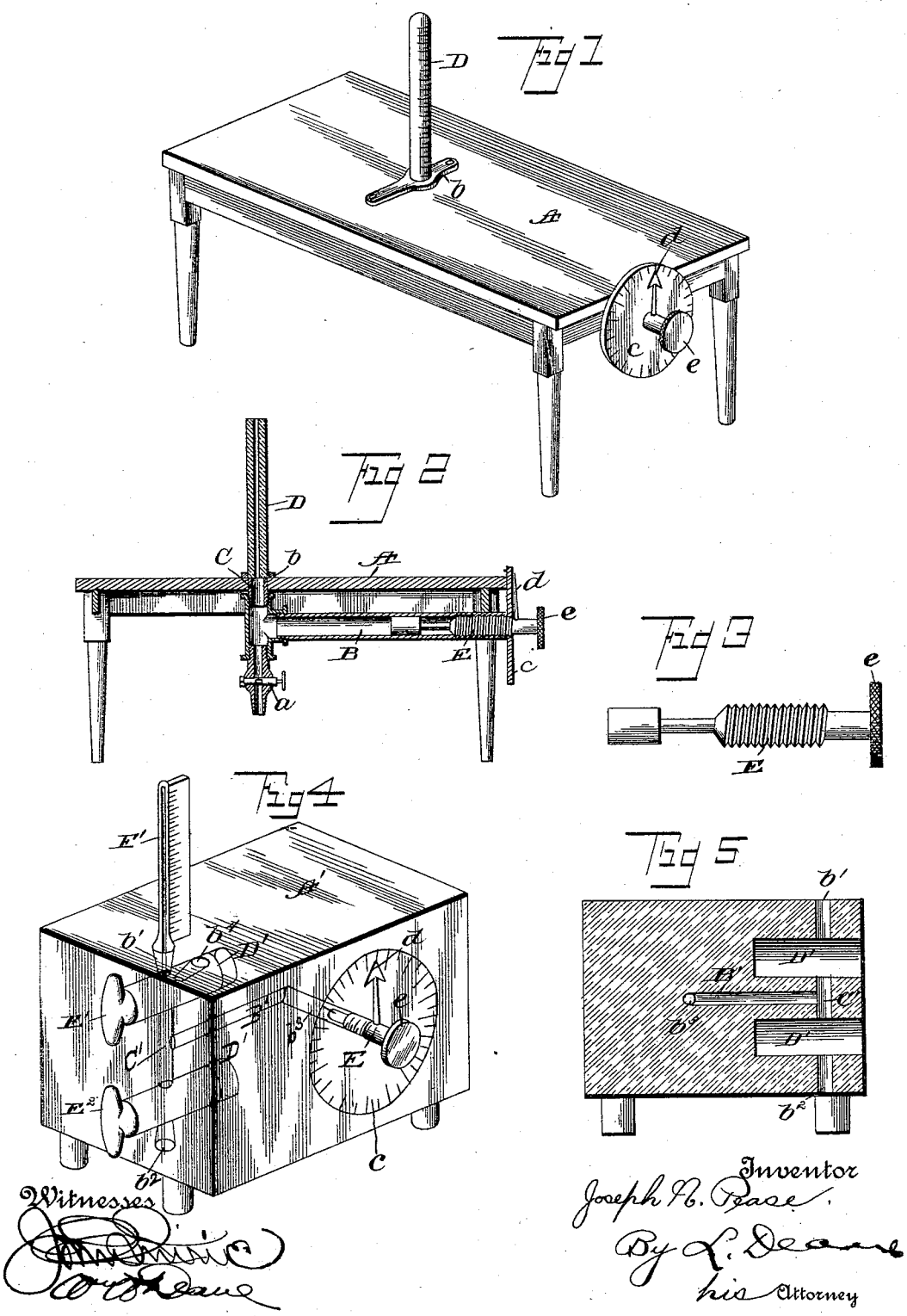

JOSEPH N. PEASE, OF DENVER, COLORADO.

MEASURING DEVICE.

SPECIFICATION forming part of Letters Patent No. 499,576, dated June 13, 1893.

Application filed September 22, 1892. Serial No. 446,595. (No model.)

*To all whom it may concern:*

Be it known that I, JOSEPH N. PEASE, a citizen of the United States, residing at Denver, in the county of Arapahoe and State of Colorado, have invented certain new and useful Improvements in Measuring Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improved instrument for getting delicate volumetric measurements. It may be used by assayers in lieu of scales for determining the size of the "bead" or "button;" in connection with scales for finding the amount of gold without "parting;" to determine the fineness of gold jewelry; or to find the exact size of any small object of any shape or form, and to these ends, the invention consists of the novel combination and construction of parts substantially as hereinafter more fully disclosed.

In the accompanying drawings, Figure 1, is a perspective view of my improved measuring instrument. Fig. 2, is a sectional elevation thereof. Fig. 3, is a detached view of the piston. Figs. 4 and 5, are views of a modification, showing another form of carrying out the invention.

In the embodiment of my invention, I provide a suitable support or table A, preferably upon the under side of which is arranged and supported a tube B, extending from near one end of the table to a little beyond the middle thereof, and connecting with another tube C, whose upper end sets in the table, and having a cock $a$, at its lower end.

D, is a suitably graduated tube—being marked off, say, into millimeters—secured or carried upon a lever $b$, pivoted to the table A, and opening at its lower end through said lever and adapted to be aligned with and ground to fit liquid-tight upon the tube C, or moved out of alignment therewith.

Secured at one end of the table A, is a suitably graduated disk or dial $c$, and arranged centrally thereof is a piston E, working in the tube B, and carrying an index or pointer $d$, registering with the graduations upon the disk or dial $c$. It will therefore be seen that, with the tubes B and C, filled with a suitable liquid—say water, and with the tube D,— in position over the tube C, by turning the piston E, inward the required extent, its index or pointer moving over the graduations of the dial $c$, the water is caused to ascend in the tube D, say, to the first graduation 1, the position of the pointer $d$ on dial $c$ being noted for subsequent reference, and then, by turning or moving the piston outward until the water recedes to the tube C, the tube D, is swung from over the tube C, and the object or substance, whose size it is desired to determine, is placed in the water or liquid in the tube C. Now replace tube D, over tube C, and turn piston E, until index or pointer $d$, registers with the same graduation on the dial $c$, the size of the object thus being indicated by the rise of the liquid in the tube D, above the graduation 1, above noted.

In lieu of carrying the tube D, upon the lever $b$, it may be hinged or pivoted directly to the table. Also, piston E, instead of being moved by a milled-head $e$ as shown, it can be manipulated by a vernier screw in case a very fine measurement is required.

In Figs. 3 and 4, is shown a modification of the invention, described as follows: A', is a block, preferably of glass having a central longitudinal passage or channel B', closed at one end and connecting at the other end with and about midway of a transverse passage or tube C', communicating at its ends, respectively, with short, inner-end closed tubes or passages D', containing stop-cocks E' E$^2$, and having discharge openings or outlets $b'$, $b^2$. F', is a similar, graduated tube as tube D, of which there may be two or more and has a ground-seat connection, with the outlet or opening $b'$.

In operation turn stop-cock E$^2$, so as to close the inner or lower end of passage C', the opening or outlet $b'$, controlled by stop-cock E', remaining open, and pour liquid into opening $b'$, the liquid passing to and filling the passage or tube $b^3$, in which works the screw ended piston E, carrying the pointer or index $d'$, registering with the dial $c$, on the face of the block. Now place in the opening $b'$, the tube F', with its scale or graduations facing in the same direction as does the dial $e$. Move piston E, inward or forward by turning the same to the right until the liquid rises in tube F', say, to graduation 10, and note the coincident or registering graduation, with the pointer $d$, on the dial $e$, being three. The piston E, is now moved outward or backward by being turned to the left until the liquid is lowered into the passage or tube C', below the stop-cock E', after which the latter is turned until it opens into passage $b^4$, the "bead," "prill," or other small object, the size of which is to be measured being dropped into said opening $b^4$. The stop-cock E', is now turned so as to open into F', of course, closing opening $b^4$, and the piston E, is turned until its index or pointer $d'$, registers again with the graduation 3, the rise or height of the liquid in the tube F', above the graduation 10, showing the exact size of the object.

When it is desired to obtain the "bead" or object measured, place a suitable dish below the instrument in line with the passage or tube C' and turn the stop-cock $E^2$, opening the lower end of said passage or tube when the "bead" or object will drop out of said passage into the dish.

I claim—

1. In a measuring instrument, the combination of a tube containing a piston adapted to effect a registration, a communicating tube arranged in a different plane thereto and a removable, graduated tube, capable of movement into, and out of alignment with the latter tube substantially as set forth.

2. In a measuring instrument, the combination with a liquid-containing tube or passage and a tube containing a piston adapted to effect a registration, and arranged in different relative angles of a graduated tube mounted upon a lever and adapted to be moved into, and out of, alignment with said liquid-containing tube, substantially as set forth.

3. In a measuring instrument, the combination of the tubes having stop-cocks and connected by a transverse passage or tube, a central longitudinal tube or passage, communicating with said transverse passage or tube a tube or passage communicating with said longitudinal tube or passage and containing a piston carrying a pointer or index effecting a registration, and a graduated, removable tube adapted to enter an opening communicating with one of said stop-cocks, said stop-cock also communicating with a second opening for the reception of the object to be measured, substantially as set forth.

4. In a measuring instrument, the combination of a liquid-containing tube, a tube arranged at an angle thereto and containing a piston adapted to effect registration, and a removable, graduated tube fitting by a ground seat into said liquid-containing tube, substantially as specified.

5. In a measuring instrument, the combination of a liquid-containing tube having a stop-cock, a graduated tube pivotally supported in alignment with the aforesaid tube, a third tube connecting with the first-named tube, a piston working in said third tube and carrying a pointer or index, and a dial with which said pointer or index registers, substantially as specified.

In testimony whereof I affix my signature in presence of two witnesses.

JOSEPH N. PEASE.

Witnesses:
R. H. GILMORE,
SAM. S. LANDON.